Nov. 18, 1941.  E. A. FREDRICKSON  2,263,537

SINK STRAINER AND PLUG AND THE LIKE

Filed Oct. 21, 1940

Inventor:
Edward A. Fredrickson
By Joseph O. Lang Atty.

Patented Nov. 18, 1941

2,263,537

UNITED STATES PATENT OFFICE 2,263,537

SINK STRAINER AND PLUG AND THE LIKE

Edward A. Fredrickson, Chicago, Ill., assignor to Crane Co., Chicago, Ill., a corporation of Illinois Application October 21, 1940, Serial No. 362,026

4 Claims. (Cl. 4—287)

More particularly, my invention relates to a novel method of providing for a simple, effective and economical sink strainer and plug or stopper combination in which the strainer and the stopper are preferably embodied in basket or cup form with the bottom portion of the basket or cup being perforated for straining purposes. In addition, I provide a plug or stopper member with an extension suitable for actuation through an opening in the bottom of the strainer and journaled therewithin. The latter provision allows for the plug being reciprocably movable so as to serve as a valve shut-off, enabling the filling of the basin of the sink with water, if desired.

A principal advantage of my invention lies in the provision of a form of strainer and stopper combination in which the basket strainer is separable from the stopper but in which the basket strainer is reciprocably movable with the stopper as the latter member is respectively moved to open and closed positions.

One of the further objects of my invention is to provide a stopper which is not only easily removable for cleaning and inspection or repair but which also acts as a rest or support for the basket strainer when the stopper is either in open or closed positions. In the invention herein set forth, I have developed a basket strainer and stopper combination in which the stopper is not only guided by the spud member of the combination but by the strainer as well. In other words, the stopper is similarly guided by the cup strainer and spud member.

Another important object lies in providing within the spud member and preferably integrally therewith one or more lugs annularly positioned so as to support the stopper when the latter is in its open position.

Another advantage of my invention lies in providing a strainer and stopper construction in which the stopper preferably by rotation in approximately one-eighth of a turn may be maintained in the open position.

As will hereinafter be more apparent, the provision of the lugs allows for a substantial support of not only the stopper but also of the strainer when the stopper is maintained in either closed or open position, and without interference with the function of the strainer.

In view of the stopper as well as the strainer being readily removable, the waste fitting combination described is economical to manufacture, simple to assemble and relatively easy to maintain in a sanitary condition.

Another advantage of my invention lies in its simple adaptability for use with a sub-strainer in which the latter member can be located so as to be easily removable or else may be clamped in place between the tailpiece and the bottom of the spud and thus held in non-rotatable relation. It may be maintained in rotatable position by suitable mounting relatively loosely upon a shoulder within the spud member, as will hereinafter be explained in greater detail.

Other objects and advantages of the construction embodying my invention will become more apparent upon proceeding with the specification and with reference to the drawing, in which Fig. 1 is a sectional assembly view of a preferred embodiment of my invention with the stopper in closed position.

Similar reference characters refer to like parts throughout the various views.

Figure 1:
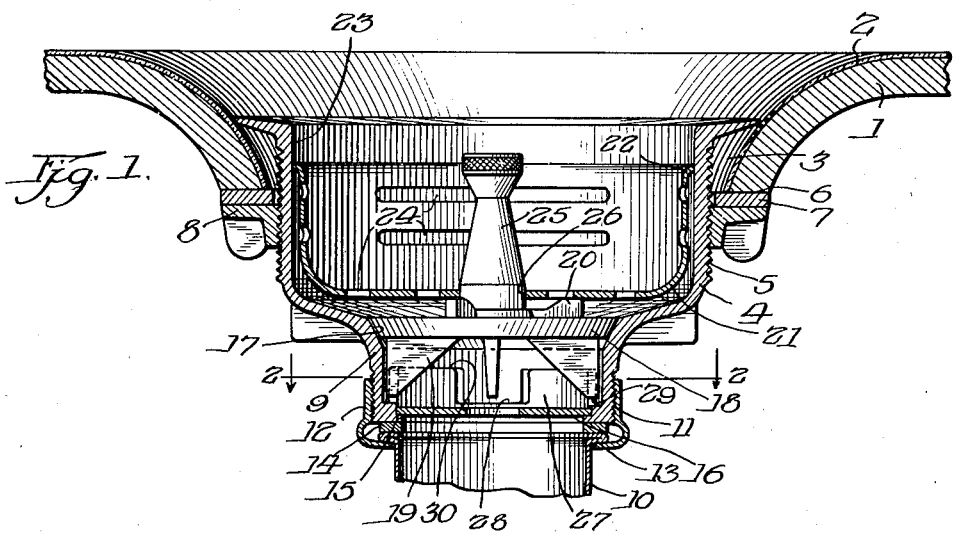

Referring to Fig. 1, the numeral 1 refers generally to the fragmentary portion of a sink structure provided with the usual vitreous enamel coating 2 and having the conventional drain opening 3 within which a tubular form of spud member 4 is applied having its upper circular flanged portion supported within the drain opening 3. The spud member beneath its flanged portion is preferably threaded, as at 5, the lowermost portion of the sink drain opening, as at 6, having a plain abutting surface against which the gasket member 7 may be positioned. In order to fixedly secure the spud member 4 to the sink, a locknut 8 is threadedly mounted upon the threads 5 of the spud member 4, thus holding the latter in position within the sink drain opening 3 and also maintaining a water-tight joint so as to prevent waste water leakage past the periphery of the spud member within the sink opening proper.

As indicated, the lower portion of the spud, as at 9, converges to provide at its extreme lower portion the threads 11 by means of which the usual water-tight connection is made to a waste pipe 10. The connection to the lower threaded portion of the spud is effected by means of the union ring 12 which clamps the shouldered portion 13 of the waste pipe 10 against the gasket 14. Preferably, although not necessarily, the lower end portion of the spud 4 is provided with a shoulder 15 upon which the sub-strainer member 16 may rest loosely for ready removal, if desired. However, if it is desired that the relatively thin metal strainer should be fixedly and non-removably mounted, it may then be inserted within the gasket 14 and extend diametrically across.

At the point of convergence 9 of the spud 4 a preferably tapered or frusto-conically formed seat 17 is provided upon which the stopper 18, likewise having a tapered peripheral portion for engagement with the tapered seat 17, rests in leak-proof relation. The lower or under side of the stop member 18 is provided with the radially extending ribs 19, the purpose of which will be described hereinafter in greater detail. On the upper side of the stopper 18 suitable lugs 20 are preferably integrally cast and upon which the bottom or lower surface portion of the cup-shaped strainer member 21 abuts. The latter provision allows for the strainer 21 to be maintained in spaced-apart relation with respect to the top of the plug 18, and the function of the strainer is not interfered with. The cup strainer 21 is provided with the preferably circular guide rim 22 for engagement with the inner peripheral surface 23 of the spud member 4. The strainer 21 at its lower and side portions is provided with the drain apertures 24, the arrangement of the latter varying, depending upon the service for which the strainer is intended.

Referring now to the detailed form of the stopper, the upper surface of the latter member in addition to being provided with the previously mentioned lugs 20 also has a substantially vertically extending post 25 which is suitably shaped for being gripped by the fingers for lifting, turning or withdrawing the stopper from the spud for purposes hereinafter explained. The post 25 projects through the aperture 26 located in the bottom of the cup-shaped strainer 21 and is thereby guided and centered by the aperture 26.

Figure 2:
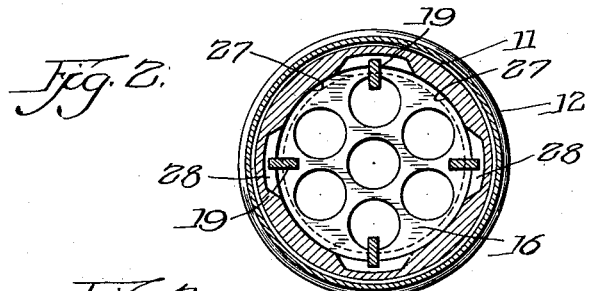
Fig. 2 is a section taken on the line 2—2 of Fig. 1.

Directing attention now to a more important aspect of my invention, the spud 4 at its lower inner peripheral or wall portion, as more clearly shown in the sectional view in Fig. 2, is preferably provided integrally with a plurality of spaced-apart lugs 27 between which the relieved portions 28 (see Fig. 2) are provided. The height of the lugs 27 is arranged so as to extend within the inner opening of the spud member for a distance sufficiently above the shoulder 15 to give the stopper member 18 a lift adequate for draining the water within the sink proper.

Figure 3:
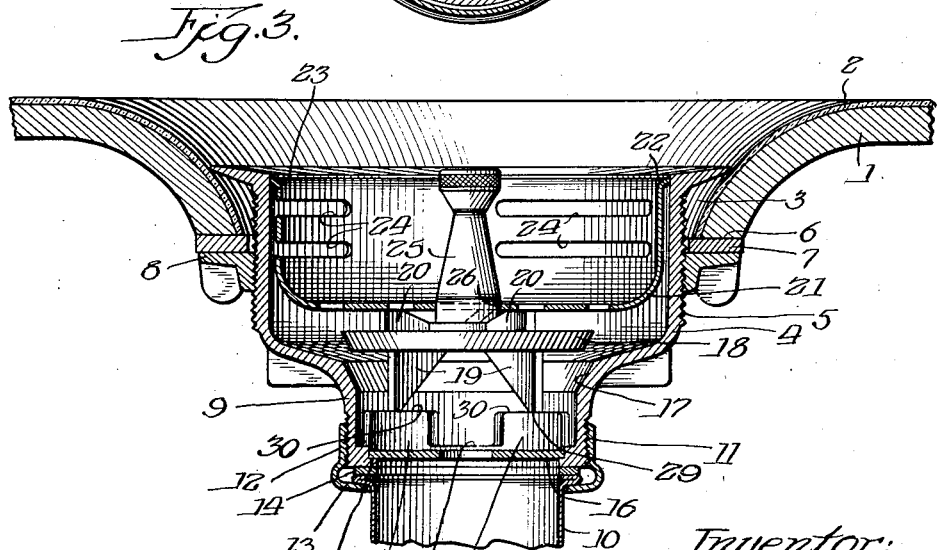
Fig. 3 is similar to Fig. 1 except with the stopper shown in the open position.

Thus as to the manner of operation of my device, by reference to Fig. 2, it will be apparent that upon gripping the post 25 with the fingers and lifting the stopper member upwardly a distance equal to approximately the height of the lugs 27 and then rotating the stopper 18 approximately one-eighth of a turn at such latter position, the lower edge 29 of the extending ribs 19 will contact with the upper surface 30 of the lugs 27. This is more clearly shown in Fig. 3 wherein the stopper 18 is shown in the open position. Further, it will be apparent that upon lifting the stopper member and rotating the latter to thereby engage the upper surface 30 of the lugs 27, the cup-shaped strainer 21 is similarly moved, the rim 22 of the strainer 21 at the latter position being substantially flush with the upper surface of the flanged portion of the spud member 4.

By use of this novel construction it will be evident that a relatively simple and substantial method is afforded for maintaining the stopper in raised or open position without necessitating expensive machining and without interfering with the passage leading to the waste pipe. The inexpensive mechanism for accomplishing this objective is easy to apply and eliminates such moving parts as are usually present in prior lifting mechanisms in strainer-stopper combinations and which have been difficult to clean and frequently have been insanitary. The particular shape or form of the lugs 27 may vary considerably in accordance with the practice or purpose for which the article is intended and, similarly, the guide ribs 19 may vary substantially from the form illustrated.

Therefore, it is apparent that my invention is capable of numerous changes within its scope, and I desire accordingly to be limited only to the extent of the claims appended hereto interpreted in the light of the prior art.

I claim:

1. In a strainer and plug combination of the character described, a hollow spud member secured within a drain opening of a sink or the like and providing a seat for the said plug, a strainer adapted to be removably positioned within the said spud member, the said plug being positioned below the said strainer and being reciprocably movable within the said spud member, the said plug having an extension passing through a suitably formed aperture in the base portion of the said strainer whereby the said strainer is removable without interference from the extension of the said plug, the said spud member having associated with its inner wall and in spaced-apart relief thereto annularly positioned means for engagement with an outer peripheral portion of the said plug member whereby upon raising and subsequently rotating the said plug the latter member is maintainable in an open position.

2. In a waste plug combination of the character described, a hollow spud member secured within a drain opening of a sink or the like and providing a seat for the said plug, a strainer superposed above the plug independently removable from the said spud member without affecting the position of the said plug, the said plug being reciprocably movable within the said spud member and having guide means suitable for slidable contact with the inner walls of the said spud member, the said spud member having upon a portion of its inner walls annularly positioned means projecting slightly therefrom for engagement with outer portions of the said guide means upon the said plug member whereby upon raising and subsequently rotating the said plug the latter member is maintained in an open position.

3. In a strainer and plug combination, a hollow spud member secured within a drain opening of a sink or the like and providing a seat for the said plug, a strainer adapted to be removably positioned within the said spud member, the said plug being positioned below the said strainer and being reciprocably movable within the said spud member relative to the said strainer, the said plug having an extension passable through a suitably formed aperture in the base portion of the said strainer whereby the latter member may be removed independently from the said spud member, the said spud member having in relief spaced-apart lugs associated with its inner wall for engagement with a peripheral portion of the said plug member whereby upon raising and subsequently rotating the said plug manually the latter member is maintained in an open position, the said plug member loosely supporting the said strainer upon raising the said plug from its seat and having means on its upper surface for maintaining the said strainer in predetermined spaced-apart relation at all positions of the plug.

4. In a strainer and plug combination of the character described, a hollow spud member secured within a drain opening of a sink or the like and providing a seat for the said plug, a strainer adapted to be removably positioned within the said spud member, the said plug being positioned below the said strainer and being reciprocably movable within the said spud member, the said plug having an extension passing through a suitably formed aperture in the base portion of the said strainer to allow for the free removal of the said latter member, the said spud member having annularly positioned means for engagement with guide means upon the said plug member whereby upon raising and subsequently rotating the said plug manually the latter member is maintained in an open position, the said plug member having spaced-apart lugs on its upper surface for support of the said strainer whereby the space provided beneath the said strainer allows for substantially free drainage therethrough past the said plug in the raised position of the latter member.

EDWARD A. FREDRICKSON.